Jan. 25, 1944. E. N. DINGLEY, JR 2,340,282
INSTRUMENT LANDING EQUIPMENT
Filed Feb. 21, 1938 4 Sheets-Sheet 1

INVENTOR
EDWARD N. DINGLEY JR.
BY
ATTORNEY

Jan. 25, 1944.  E. N. DINGLEY, JR  2,340,282
INSTRUMENT LANDING EQUIPMENT
Filed Feb. 21, 1938  4 Sheets-Sheet 2

INVENTOR
EDWARD N. DINGLEY JR.
BY
ATTORNEY

Jan. 25, 1944.     E. N. DINGLEY, JR     2,340,282
INSTRUMENT LANDING EQUIPMENT
Filed Feb. 21, 1938     4 Sheets-Sheet 3

INVENTOR
EDWARD N. DINGLEY JR.
BY
ATTORNEY

Jan. 25, 1944.  E. N. DINGLEY, JR  2,340,282
INSTRUMENT LANDING EQUIPMENT
Filed Feb. 21, 1938   4 Sheets-Sheet 4

INVENTOR
EDWARD N. DINGLEY JR.
BY
Ransom K. Davis
ATTORNEY

Patented Jan. 25, 1944

2,340,282

UNITED STATES PATENT OFFICE 2,340,282

INSTRUMENT LANDING EQUIPMENT

Edward N. Dingley, Jr., Arlington, Va.

Application February 21, 1938, Serial No. 191,735

23 Claims. (Cl. 177—352)

(Granted under the act of March 3, 1883, as amended April 30, 1928; 370 O. G. 757)

My invention relates broadly to instrument landing systems by means of which aircraft may be guided safely along a predetermined landing glide path and caused to land properly at a designated point at times of low or zero visibility.

My invention relatees chiefly to circuit arrangements in which the relative magnitude of two electromagnetic fields produced on or near the surface of the earth is indicated visually at a point in space occupied by an aircraft.

One of the objects of my invention is to provide and instrument landing system by means of which a predetermined glide path is fixed in space regardless of the variations of ground conductivity normally encountered.

Another object of my invention is to provide a means for establishing and maintaining under all conditions a glide path in space having any desired curvature or configuration.

Still another object of my invention is to provide equipment suitable for installation on the ground and other equipment suitable for installation in aircraft which will at all times make possible the determination, by the pilot of the craft, the exact position of the craft relative to the predetermined glide path.

Other and further objects of my invention will be understood from the following specification and by reference to the accompanying drawings in which.

Figure 1:
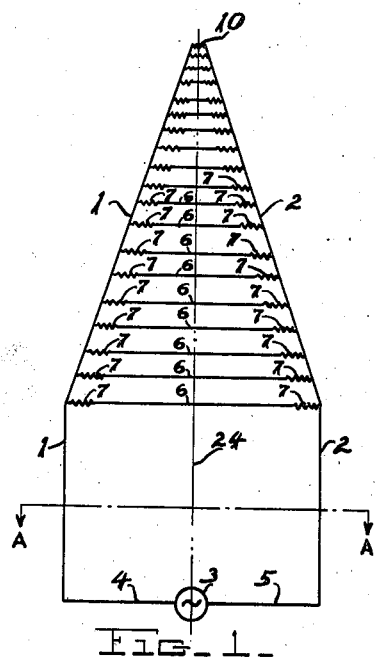
Fig. 1 shows one embodiment of the ground equipment of my invention.

Fig. 1 represents one embodiment of my invention wherein the horizontal cables 1 and 2 are laid on, under, or above the surface of the earth on each side of and equally spaced from a landing runway 24. The cables 1 and 2 are interconnected at intervals throughout their length by the cables 6 in series with each of which there are inserted the resistors 7. Point 10 represents the point at which a landing aircraft should make contact with the earth. The alternating current source 3 is connected by means of the cables 4 and 5 to the ends of the cables 1 and 2 which are the most remote from point 10.

Figures 2, 3:
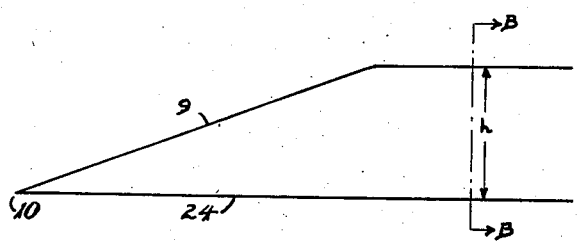
Fig. 2 is a section taken through A—A of Fig. 1.
Fig. 3 is a side elevation of Fig. 2.

Fig. 2 represents a section taken through A—A of Fig. 1. The aircraft carrying loops 28 and 29 is represented as being at the height $h$ above the runway 24 and the cables 1 and 2 are represented as being spaced from the runway by the distance $d$. It is desirable but not mandatory that the distance $h$ and corresponding distance $d$ at any point in the runway should be equal.

Fig. 3 shows a side elevation of Fig. 2 taken through the runway 24. A section B—B of Fig. 3 is represented by Fig. 2.

In the preferred mode of operation of my invention, the voltage of the alternating source 3 is adjusted to produce a current flow through cables 1 and 2 at Section A—A of sufficient value to produce an alternating field having the value F at a radial distance X from the cables 1 and 2; the value F being such that the maximum potential induced in a loop collector mounted in the aircraft will be considerably in excess of the potentials induced in the same loop by locally generated fields surrounding the aircraft, and the distance X being the hypotenuse of the triangle $d-h-x$ of Fig. 2 where $h$ is the desired height of the aircraft at the start of the glide path.

In order to establish the desired glide path 9, the shunting cables 6 are located at such points and the resistors 7 are adjusted to such values that the current flowing through the cables 1 and 2 diminishes as a linear or any other desired function of the distance along the cables from the start of the glide path. In this manner the radial distance X from the cables 1 and 2 to the point of field strength F is caused to diminish as a linear or any other desired function of the distance along the cables from the start of the glide path.

Having thus established in space a glide path represented by the locus of the points of constant field strength F, it is only necessary to provide in the aircraft, means to indicate the position of the aircraft relative to this locus in order to make possible the guidance of the aircraft along the predetermined glide path, such means being next described.

Figure 4:
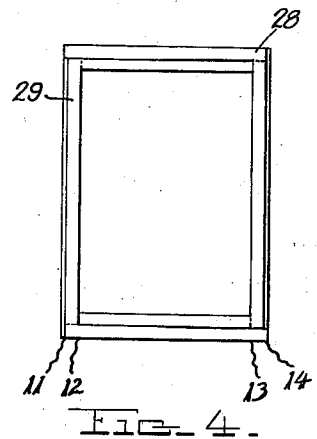
Fig. 4 is a plan view of one embodiment of the aircraft collector system of my invention.
Figure 5:
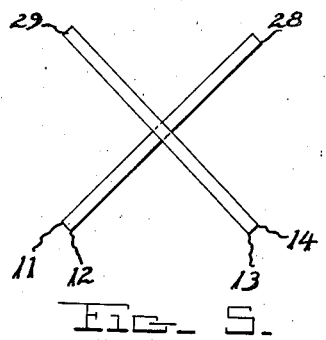
Fig. 5 is an end elevation of Fig. 4.

Fig. 4 is a plan view and Fig. 5 is an end elevation of two loop type collectors 28 and 29 having terminals 11—12 and 13—14 respectively. In operation, the said two loops are mounted co-axially in space quadrature within the fuselage of the aircraft and are oriented so that the plane of each loop lies at an angle of 45 degrees to the earth when the aircraft is in normal flight. Under these conditions when the aircraft is flying along and centered on the established glide path, one of each of the said loop collectors will lie in a plane producing a maximum of induced voltage from one of the ground cables 1 and 2 and a minimum of induced voltage from the other of said cables.

Figure 6:
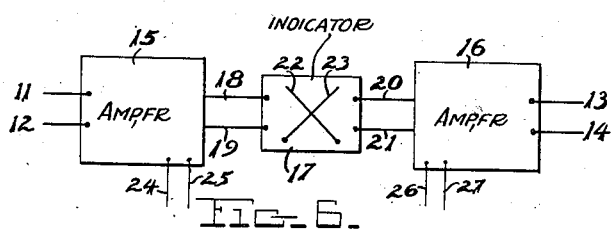
Fig. 6 shows schematically one embodiment of the amplifying and indicating aircraft equipment of my invention.

Fig. 6 is a diagrammatic representation of two amplifiers 15 and 16 of conventional design which include substantially linear detectors of conventional design and which are capable of delivering at their output terminals 18—19 and 20—21 direct currents which are substantially proportional in amplitude to the amplitudes of the voltages applied to their respective input terminals 11—12 and 13—14. The instrument 17 of conventional design contains two d'Arsonval current indicating instruments of conventional design mounted in such a manner that their respective pointers 22 and 23 intersect or cross, as shown, at the approximate center of the instrument whenever each pointer is indicating approximately half scale deflection. One d'Arsonval instrument is connected to the output terminals 18—19 of amplifier 15 and the other said instrument is connected to the output terminals 20—21 of the other amplifier 16 as shown.

In the preferred mode of operation of my invention the input terminals 11—12 of amplifier 15 and the input terminals 13—14 of amplifier 16 are connected directly to the identically numbered output terminals of the loop type collectors shown in Figs. 4 and 5 and the gain or amplification of each of the said amplifiers is adjusted so that a field of strength F cutting each of said loops causes each of said pointers 22 and 23 to deflect half its total scale distance. Under these conditions the said two pointers will cross at the designated center of the instrument 17 and thus indicate that each of said loops is being cut by a field of strength F or, conversely, that the aircraft is situated exactly on the desired glide path. It follows from the foregoing description that should the aircraft deviate to a point directly above or below the glide path, the fields cutting the said loops will decrease or increase respectively by like amounts and the pointers 22 and 23 will cross at a point respectively above or below the designated center of the instrument 17 and thus indicate the position of the aircraft relative to the glide path. In the same manner, should the aircraft deviate to the right or left of the glide path, the field cutting one of the said loops will increase while the other will decrease thus causing the said pointers to cross at a point to the right or left of the designated center of the said instrument.

Experience has shown that when using the design factors herein described, the magnetic field produced by currents flowing in the ground cables 6 of Fig. 1 is negligibly small in comparison to the magnetic field produced by the currents flowing in the adjacent sections of cables 1 and 2.

Figure 17:
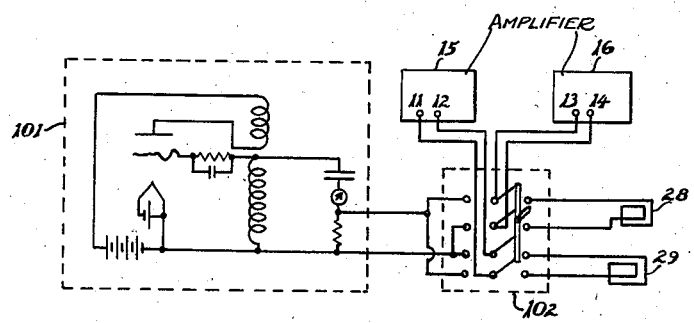
Fig. 17 shows diagrammatically an oscillator connectable to the landing system for calibration purposes.

My invention contemplates, as in Fig. 17, the use in the aircraft of a conventional source 101, such as a vacuum tube oscillator, of a calibrated alternating potential of the same frequency as that supplied to the cables 1 and 2 by the ground station source 3. By means of conventional switches 102 this said aircraft source will be connected to the input terminals of the amplifiers 15 and 16 in place of the loops of Fig. 5 whenever it is desired to calibrate the apparatus of Fig. 6. Calibration of the loops of Fig. 5 will be accomplished at the time of their installation by conventional means.

My invention also contemplates the use of conventional types of bias circuits in connection with the d'Arsonval instruments contained in instrument 17. Such circuits will permit the use of more sensitive instruments and will therefore provide a more sensitive off-course indication.

Figure 18:
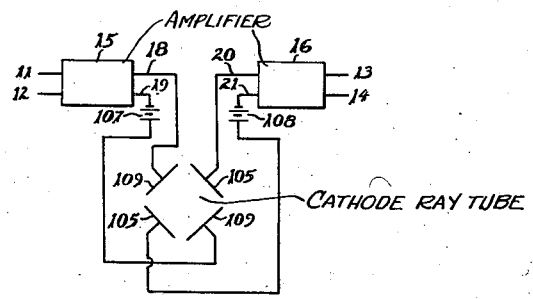
Fig. 18 is a schematic diagram of a cathode ray tube connected to be used as an indicator.

A cathode ray tube (Fig. 18) may be used to serve the same purpose as the indicating instrument 17. The connection of the pairs of deflection plates 105 and 109 of the cathode ray tube to output terminals of the amplifiers 15 and 16, and the means 107 and 108 for biasing the cathode ray beam to cause it to be centered within the tube for normal D. C. output of each of said amplifiers are entirely conventional and will be obvious to anyone skilled in the art.

Figure 7:
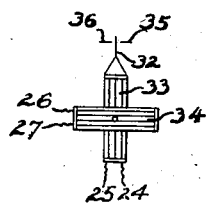
Fig. 7 shows a conventional type of instrument that may be used to indicate the phase relations of the currents from the coils.
Figure 9:
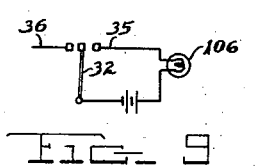
Fig. 9 illustrates the connection of a tell-tale light to show when the aircraft is completely off course.

My invention also contemplates the use of conventional means for indicating the phase relationship between the voltages induced in the two loops as mounted in the aircraft. This phase indicating means may be utilized to indicate whether the aircraft lies within or without the zone bounded by the two vertical projections of cables 1 and 2. One such phase indicating means of conventional design consists of a relay, depicted in Fig. 7, the armature 32 of which is actuated by the moving coil 33 of a dynamometer-type electrical indicating instrument of conventional type. In the prefered mode of operation, the moving coil 33 of the dynamometer instrument is energized by a portion of the amplified alternating current obtainable from amplifier 15, and the field coil 34 is energized by a portion of the amplified alternating current obtainable from amplifier 16. Under these conditions, the armature 32 of the dynamometer instrument will contact one of its relay springs 35 whenever the alternating outputs of the amplifiers 15 and 16 have a given phase relationship, or conversely, whenever the outputs of the loops of Fig. 5 have a given phase relationship, and will contact the other of its relay springs 36 whenever the alternating outputs of the amplifiers 15 and 16 or of the loops of Fig. 5 have the opposite phase relation. The relay armature and its springs may be used, as in Fig. 9, to close the circuit of a pilot light 106 to indicate whenever the aircraft is inside the aforesaid zone.

My invention also contemplates the omission of the inter-connecting cables 6 and the substitution of the conducting earth therefor.

Figure 8:
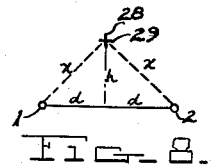
Fig. 8 depicts the use of a vertical and a horizontal coil.

Fig. 8 shows another arrangement of coils 28 and 29 that, while not so desirable as the apparatus above described, may be used to practice the present invention. In Fig. 8 the coils are disposed with coil 28 lying vertically and coil 29 lying horizontally and hence when the loops are in the positions shown in the figure there will be output current from loop 29 but none from loop 28. However, when the loops are moved laterally from the position shown there will be a change in the output of loop 29 and furthermore there will also be output from loop 28 having a direction of flow that will depend upon the direction of the lateral movement.

Figure 10:
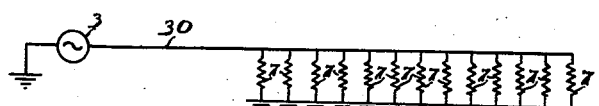
Fig. 10 illustrates the use of a single grounded cable instead of two interconnected cables as in Figs. 1, 2, 8 and 9.

Fig. 10 shows a single conductor 30 disposed along the landing path, grounded at intervals through the resistors 7 to effect a progressive diminution of the magnetic field strength around the conductor, the return being through earth. Inequalities of current through the several ground connections that might result from differences of conductivity in the ground may be compensated by empirically adjusting the values of the resistors to attain the desired result.

Figures 11, 12:
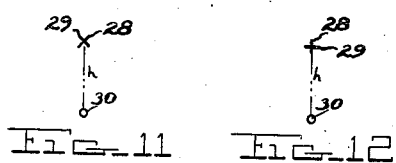
Figs. 11 and 12 show different coil arrangements that may be used in conjunction with the single cable of Fig. 10.

Fig. 11 depicts the use of loops 28 and 29 set at 45° to the horizontal, and Fig. 12 shows loop 29 horizontal and loop 28 vertical, used with the single grounded conductor 30. In view of the foregoing, it appears unnecessary to discuss in detail the operation of the devices shown in these figures.

Figure 14:
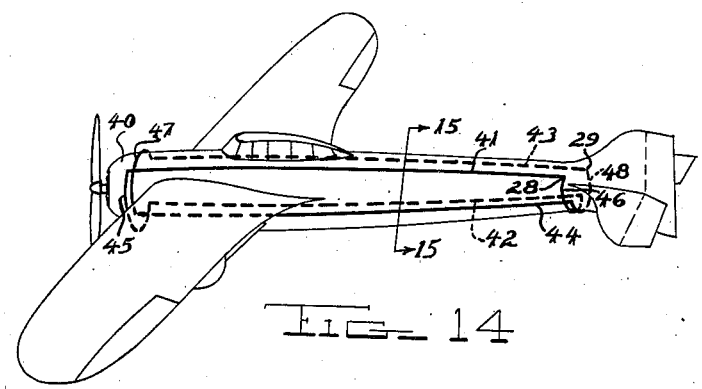
Fig. 14 shows in diagrammatic side elevation one method of mounting the coils on an aircraft.
Figure 15:
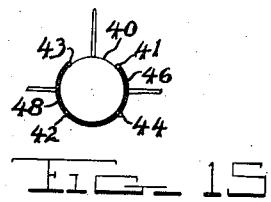
Fig. 15 is a cross-sectional elevation taken on the line 15—15, Fig. 14.
Figure 13:
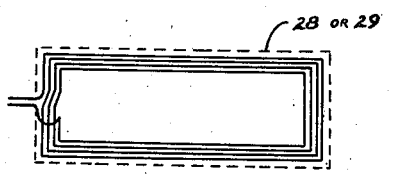
Fig. 13 illustrates one of the pick-up coils.

Fig. 14 discloses an effective arrangement for mounting the loops 28 and 29 upon an aircraft 40. As shown in Fig. 13 the loops 28 and 29 are made by taking a cable of suitable length having, for example, twenty conductive wires in a suitable sheath and connecting the ends of the wires in series, leaving the two ends of each coil thus formed to be connected to leads 11, 12 and 13, 14, respectively. The loops 28' and 29' are attached to the inside or outside of the fuselage of aircraft 40 with longitudinal side portions 41, 42 and 43, 44, respectively, so disposed that a plane through the side portions of each loop lies at an angle of 45° to the horizontal, when the airplane is in normal attitude, the ends of the respective loops being designated 45, 46 and 47, 48. It is apparent that this construction will provide loops of length approximating that of the aircraft, and that these loops may be arranged in any of the positions indicated in other figures of the drawings.

Figure 16:
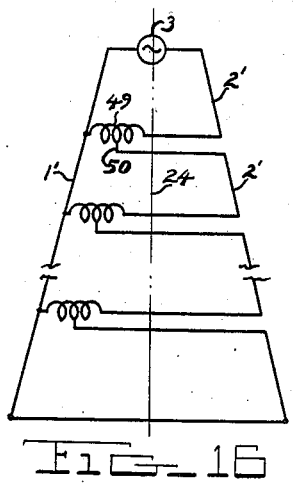
Fig. 16 illustrates an alternative method of producing the magnetic field.

Fig. 16 shows a further method of producing the magnetic fields of varying strength. Here the source 3 of alternating current is adjacent the designated landing point, and the current flows through a conductor 1' and a plurality of sectional conductors 2' so arranged as to set up a substantially continuous field, each of the conductors 2' being connected to conductor 1' through a transformer coil 49 which may be so connected to the next conductor 2' by a tap 50 as to constitute an auto transformer, thereby giving rise to progressively increasing magnetic field strength away from source 3. It is within the purview of my invention to make conductor 1' also in sections and use transformers having separate primary and secondary coils instead of the auto transformers illustrated, as will be readily apparent to those skilled in this art. If the distance between successive transformers increases logarithmically, the transformers may all be alike, otherwise the transformation ratio must be varied to secure the uniform incremental change in the magnetic fields.

The following formula is used to determine the voltage induced in each loop collector mounted in the aircraft:

$$V = 384 \, fINb \, 10^{-3} \log_e \frac{X_b X_a'}{X_a X_b'}$$

Where:

$V$ = Microvolts induced in each loop.
$f$ = Cycles per second frequency of source 3.
$I$ = Amperes flowing in cables 1 and 2 at any point.
$N$ = Number of turns in each loop.
$b$ = Length in fact of loop sides parallel to earth.
$X_a$ = Radial distance in feet from cable to first limb of loop.
$X_b$ = Radial distance in feet from cable 1 to second limb of loop.
$X_a'$ = Radial distance in feet from cable 2 to first limb of loop.
$X_b'$ = Radial distance in feet from cable 2 to second limb of loop.

As an example of the large values of induced loop voltages obtainable, assume that an aircraft having loops 12 ft. by 4 ft. of 80 turns each, is located on the glide path at an altitude of 1000 feet and is flying in a level attitude. Also assume that a 500 cycle current of 5 amperes is flowing through cables 1 and 2 at a point directly below the aircraft. Considering the loop the plane of which intersects cable 1, it is found that $X_a$ equals 1414 feet, $X_b$ equals 1417 feet and that $X_a'/X_b'$ equals unity. Upon substituting the foregoing values in the above formula, it is found that 2600 microvolts are induced in the loop.

It will be noted, when the radial distance is large compared to the radial dimension of the loop, that to a close approximation, the voltage induced in the loop is inversely proportional to the radial distance of the loop from the cable.

The invention herein described and claimed may be used and/or manufactured by or for the Government of the United States of America for governmental purposes without the payment of any royalties thereon or therefor.

I claim:

1. An instrument landing system for aircraft, comprising a pair of electrically conductive members spaced apart a distance on the order of twice a suitable height to begin a landing glide and lying parallel to each other in a horizontal plane and then converging toward a median horizontal line at an angle substantially on the order of a suitable angle of glide for landing, means to supply alternating current to said members, a plurality of parallel connections between the converging portions of said members each including a resistance at each end and a conductive portion between the resistances, the values of said resistances being so chosen that the change in current along said members, due to the current shunted through said connections, produces a change in the magnetic field surrounding each member such that the perpendicular distance from each member to a point of predetermined magnetic field strength diminishes along said converging portions so that the locus of said points defines a glide path, and means adapted to be carried aboard an aircraft including two coils oppositely inclined at angles of substantially 45° to the horizontal, the planes of said coils intersecting in a line parallel to the fore and aft center line of the fuselage, wherein voltages are induced by said magnetic fields, means to amplify said induced voltages, and means actuated by said amplified currents to indicate the relative positions of said coils with respect to said glide path.

2. An instrument landing system for aircraft, comprising a pair of electrically conductive members spaced apart a distance on the order of twice a suitable height to begin a landing glide and lying parallel to each other in a horizontal plane and then converging toward a median horizontal line at an angle substantially on the order of a suitable angle of glide for landing, means to supply alternating current to said members, a plurality of parallel connections between the converging portions of said members each including a resistance at each end and a conductive portion between the resistances, the values of said resistances being so chosen that the change in current along said members, due to the current shunted through said connections, produces a change in the magnetic field surrounding each member such that the perpendicular distance from each member to a point of predetermined magnetic field strength diminishes along said converging portions so that the locus of said points defines a glide path, and means adapted to be carried aboard an aircraft including means responsive to the magnetic fields surrounding each of said members, and means actuated by said responsive means to indicate the position of said aircraft with respect to said glide path.

3. An instrument landing system for aircraft, comprising a pair of electrically conductive members spaced apart a distance on the order of twice a suitable height to begin a landing glide and lying parallel to each other in a horizontal plane and then converging toward a median horizontal line at an angle substantially on the order of a suitable angle of glide for landing, means to supply alternating current to said members, parallel cross connections between said converging portions to reduce the current in said members as a function of the distance from the beginning of said convergence whereby the perpendicular distance from each member to a point of predetermined magnetic field strength decrease in accordance with said function, so that the locus of said points defines a glide path, and means adapted to be carried aboard an aircraft including two coils oppositely inclined at angles of substantially 45° to the horizontal wherein voltages are induced by said magnetic fields, means to amplify said induced voltages, and means actuated by said amplified voltages to indicate the relative positions of said coils with respect to said glide path.

4. An instrument landing system for aircraft, comprising a pair of electrically conductive members spaced apart a distance on the order of twice a suitable height to begin a landing glide and lying parallel to each other in a horizontal plane and then converging toward a median horizontal line at an angle substantially on the order of a suitable angle of glide for landing, means to supply alternating current to said members, parallel cross connections between said converging portions to reduce the current in said members as a function of the distance from the beginning of said convergence whereby the perpendicular distance from each member to a point of predetermined magnetic field strength decreases in accordance with said function, so that the locus of said points defines a glide path, and means adapted to be carried abroad an aircraft including means responsive to the magnetic field around each said member, and means actuated by said responsive means to indicate the position of said aircraft with respect to said glide path.

5. An instrument landing system for aircraft, comprising means to set up two like fluctuating magnetic fields symmetrically disposed with respect to a median horizontal line, means to vary progressively the strength of said fields so that the locus of points common to said fields having a predetermined field strength defines a glide path for landing an aircraft, and means adapted to be carried aboard an aircraft including two coils oppositely inclined at angles of substantially 45° to the horizontal, the planes of said coils intersecting in a line parallel to the fore and aft center line of the fuselage, wherein voltages are induced by said magnetic fields, means to amplify said induced voltages, and means actuated by said amplified voltages to indicate the relative positions of said coils with respect to said glide path.

6. An instrument landing system for aircraft, comprising a pair of electrically conductive members spaced apart a distance on the order of twice a suitable height to begin a landing glide and lying parallel to each other in a horizontal plane and then converging toward a median horizontal line at an angle substantially on the order of a suitable angle of glide for landing, means to supply alternating current to said members, a plurality of parallel connections between the converging portions of said members each including a resistance at each end and a conductive portion between the resistances, the values of said resistances being so chosen that the change in current along said members, due to the current shunted through said connections, produces a change in the magnetic field surrounding each member such that the perpendicular distance from each member to a point of predetermined magnetic field strength diminishes along said converging portions so that the locus of said points defines a glide path and means adapted to be carried aboard an aircraft including separate coil means disposed to be differentially responsive to the magnetic fields around said members and to have electric currents induced therein, and means actuated by said induced currents to indicate the position of said aircraft with respect to said glide path.

7. An instrument landing system for aircraft, comprising means to set up two like fluctuating magnetic fields symmetrically disposed with respect to a median horizontal line, means to vary progressively the strength of said fields so that the locus of points common to said fields having a predetermined field strength defines a glide path for landing an aircraft, and means adapted to be carried aboard an aircraft including separate coil means disposed to be differentially responsive to the magnetic fields around said members and to have electric currents induced therein; and means actuated by said induced currents to indicate the position of said aircraft with respect to said glide path.

8. An instrument landing system for aircraft, comprising means to set up two converging fluctuating magnetic fields symmetrical about a median horizontal line and diminishing in strength toward the point of convergence of said fields as a function of the rate of said convergence, and means adapted to be carried aboard an aircraft and having devices responsive to said fields, and indicating means actuated by said devices to show the position of said aircraft with respect to the locus of points common to both said fields having a predetermined field strength.

9. In an instrument landing system for aircraft, a pair of electrically conductive members spaced apart a distance on the order of twice a suitable height to begin a landing glide and lying parallel to each other in a horizontal plane and then converging toward a median horizontal line at an angle substantially on the order of a suitable angle of glide for landing, means to supply alternating current to said members, a plurality of parallel connections between the converging portions of said members each including a resistance at each end and a conductive portion between the resistances, the values of said resistances being so chosen that the change in current along said members, due to the current shunted through said connections, produces a change in the magnetic field surrounding each member such that the perpendicular distance from each member to a point of predetermined magnetic field strength diminishes along said converging portions so that the locus of said points defines a glide path.

10. In an instrument landing system for aircraft, means to set up two like fluctuating magnetic fields symmetrically disposed with respect to a median horizontal line, and means to vary progressively the strength of said fields so that the locus of points common to said fields having a predetermined field strength defines a glide path for landing an aircraft.

11. An instrument landing system, comprising a conducting member, a plurality of means each including a resistor to ground said member at intervals, said resistors each having such respective values that the current in said member decreases as a function of the length of said member, means to supply alternating current to said member to set up a magnetic field around said member such that the locus of points vertically above said member having a predetermined field strength defines a glide path for landing an airplane, and means adapted to be carried aboard an aircraft responsive to said magnetic field to indicate the position of said means with respect to said glide path.

12. A piloting system for a moving body, comprising electric circuit means including at least one conducting member extending toward an objective point to be reached by said body, means to supply alternating current to said circuit means to set up a fluctuating magnetic field around said means to vary the effective current in said circuit, means to cause said field to diminish in strength as a function of the length of said circuit, means responsive to said field adapted to be carried aboard said body, and means actuated by said responsive means to indicate the position of said body with respect to said locus.

13. An instrument landing system for aircraft, comprising means to set up two like fluctuating magnetic fields symmetrically disposed with respect to a median horizontal line, means to vary progressively the strength of said fields so that the locus of points common to said fields having a predetermined field strength defines a glide path for landing an aircraft, and means adapted to be carried aboard an aircraft including a vertically disposed coil and a horizontally disposed coil wherein currents are induced by said magnetic fields, and means actuated by said induced currents to indicate the relative positions of said coils with respect to said glide path.

14. An instrument landing system for aircraft, comprising means to set up two like fluctuating magnetic fields symmetrically disposed with respect to a median horizontal line, means to vary progressively the strength of said fields so that the locus of points common to said fields having a predetermined field strength defines a glide path for landing an aircraft, and means adapted to be carried aboard an aircraft including two coils oppositely inclined at angles of substantially 45° to the horizontal, the planes of said coils intersecting in a line parallel to the fore and aft center line of the fuselage, wherein currents are induced by said magnetic fields, means to amplify said induced currents, means actuated by said amplified currents to indicate the relative positions of said coils with respect to said glide path, and other means actuated by said amplified currents to indicate the phase relations of said currents.

15. An instrument landing system for aircraft, comprising a pair of electrically conductive members spaced apart a distance on the order of twice a suitable height to begin a landing glide and lying parallel to each other in a horizontal plane and then converging toward a median horizontal line at an angle substantially on the order of a suitable angle of glide for landing, means to supply alternating current to said members, a plurality of parallel connections between the converging portions of said members each including a resistance at each end and a conductive portion between the resistances, the values of said resistances being so chosen that the change in current along said members, due to the current shunted through said connections, produces a change in the magnetic field surrounding each member such that the perpendicular distance from each member to a point of predetermined magnetic field strength diminishes along said converging portions so that the locus of said points defines a glide path, and means adapted to be carried aboard an aircraft including separate coil means disposed to be differentially responsive to the magnetic fields around said members and to have electric currents induced therein; means actuated by said induced currents to indicate the position of said aircraft with respect to said glide path and other means actuated by said amplified currents to indicate the phase relations of said currents.

16. An instrument landing system for aircraft, comprising means to set up two like fluctuating magnetic fields symmetrically disposed with respect to a median horizontal line, means to vary progressively the strength of said fields so that the locus of points common to said fields having a predetermined field strength defines a glide path for landing an aircraft, and means adapted to be carried aboard an aircraft including a vertically disposed coil wherein currents are induced by said magnetic fields, and means actuated by said induced currents to indicate the position of said coil with respect to said glide path.

17. An instrument landing system, comprising a conducting member, a plurality of means each including a resistor to ground said member at intervals, said resistors each having such respective values that the current in said member decreases as a function of the length of said member, means to supply alternating current to said member to set up a magnetic field around said member such that the locus of points vertically above said member having a predetermined field strength defines a glide path for landing an airplane, a vertically disposed coil, wherein currents are induced by said field, adapted to be carried aboard an aircraft, and means actuated by said induced currents to indicate the position of said coil with respect to said glide path.

18. In combination with an aircraft having a fuselage, an inductive loop mounted on said fuselage, said loop having longitudinally extending portions on opposite sides of the median longitudinal plane of said craft so disposed that a plane through said portions lies at substantially 45° to the horizontal, and a like loop mounted on said fuselage to lie substantially at right angles to the first-mentioned loop, the planes of said coils intersecting in a line parallel to the fore and aft center line of the fuselage.

19. Means for producing substantially coextensive elongated magnetic fields varying in strength longitudinally thereof, comprising a conductive member, transformer means connected to said member at intervals, and means coacting with each of said transformer means to constitute a closed circuit wherein flows a current dependent upon the ratio of transformation in each of said transformer means, each said circuit including a portion disposed to give rise to a magnetic flux equal to and symmetrically disposed with respect to that portion of said member included in the same circuit therewith, and a source to supply alternating current thereto.

20. Instrument landing means for an aircraft, comprising two coils wherein voltages are induced by a varying magnetic field, said coils being disposed substantially parallel to the longitudinal axis of an aircraft, with the planes of said coils intersecting in a line parallel to the said longitudinal axis and with the planes of said coils at right angles to each other and at substantially 45° to the horizontal in normal flight attitude, means to amplify and rectify the voltages induced in each said coil, an indicating means including two movable pointers parallel to each other when said indicating means is not energized, each pointer being connected to be actuated by the rectified voltage from a respective one of said coils, the circuit values of the connecting means to operate said pointers being so adjusted that each said pointer is moved through an angle of substantially 45° to intersect the other pointer in the predetermined point when said voltages from the two coils are equal and of a selected value, and by the departure of that point of intersection from said predetermined point indicating substantially linearly the direction and magnitude of displacement of said coils from a position in said magnetic field where such induced voltages will be equal and of said selected value.

21. An instrument landing system for aircraft, comprising two coils mounted on the fuselage of a craft and extending substantially the full length of said fuselage, one of said coils extending through the other whereby the effective planes of said coils are at angles of substantially 45° to the vertical longitudinal plane of said craft when in normal flight attitude.

22. An instrument landing system for aircraft, comprising two coils mounted on the fuselage of a craft and extending substantially the full length of said fuselage, one of said coils extending through the other whereby the effective planes of said coils are at angles of substantially 45° to the vertical longitudinal plane of said craft when in normal flight attitude and means carried by said craft to indicate the relative values of the voltages induced in said coils by a varying magnetic field.

23. An instrument landing system for aircraft, comprising two coils mounted on the fuselage of a craft and extending substantially the full length of said fuselage, one of said coils extending through the other whereby the effective planes of said coils are at angles of substantially 45° to the vertical longitudinal plane of said craft when in normal flight attitude, means carried by said craft to indicate the relative values of the voltages induced in said coils by a varying magnetic field and means to indicate the relative phases of said induced voltages.

EDWARD N. DINGLEY, Jr.